March 16, 1965   D. D. CAMPBELL ETAL   3,173,826
FOAMED STRIP MATERIAL AND METHOD OF MAKING
Filed June 9, 1959   2 Sheets-Sheet 1
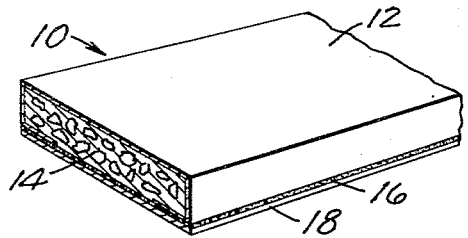
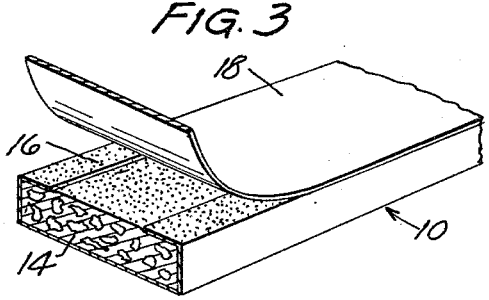
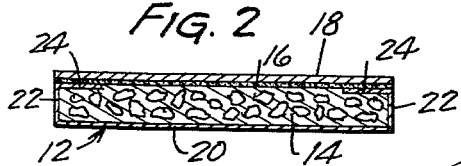
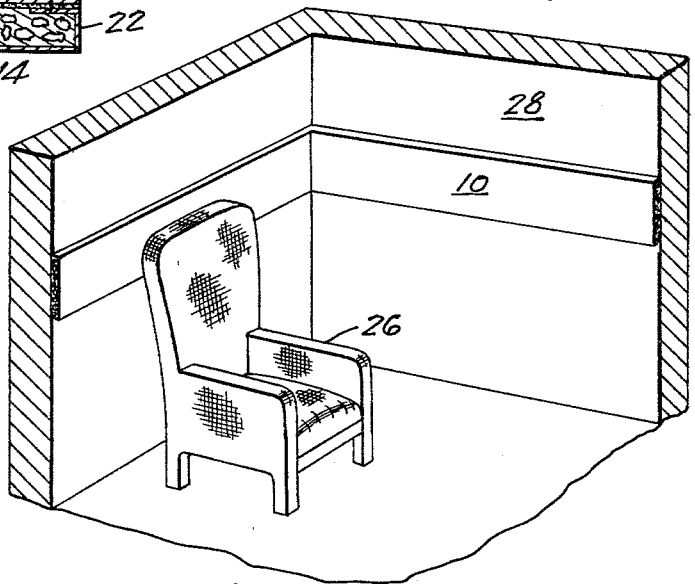
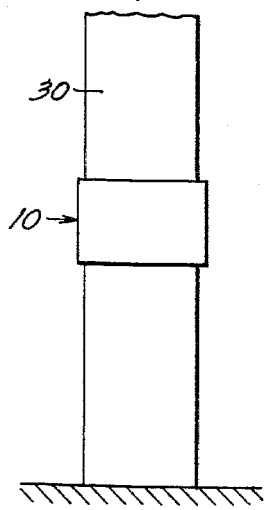
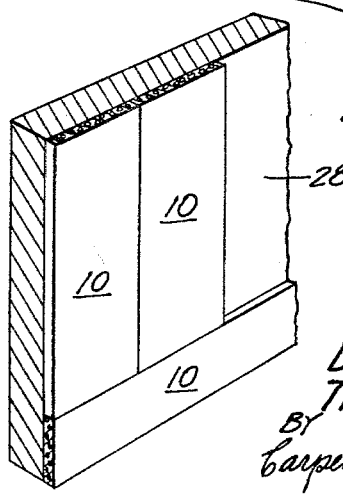
INVENTORS
DOUGLAS D. CAMPBELL
THEODORE BUCHHOLTZ
BY
Carpenter, Abbott, Coulter & Kinney
ATTORNEYS

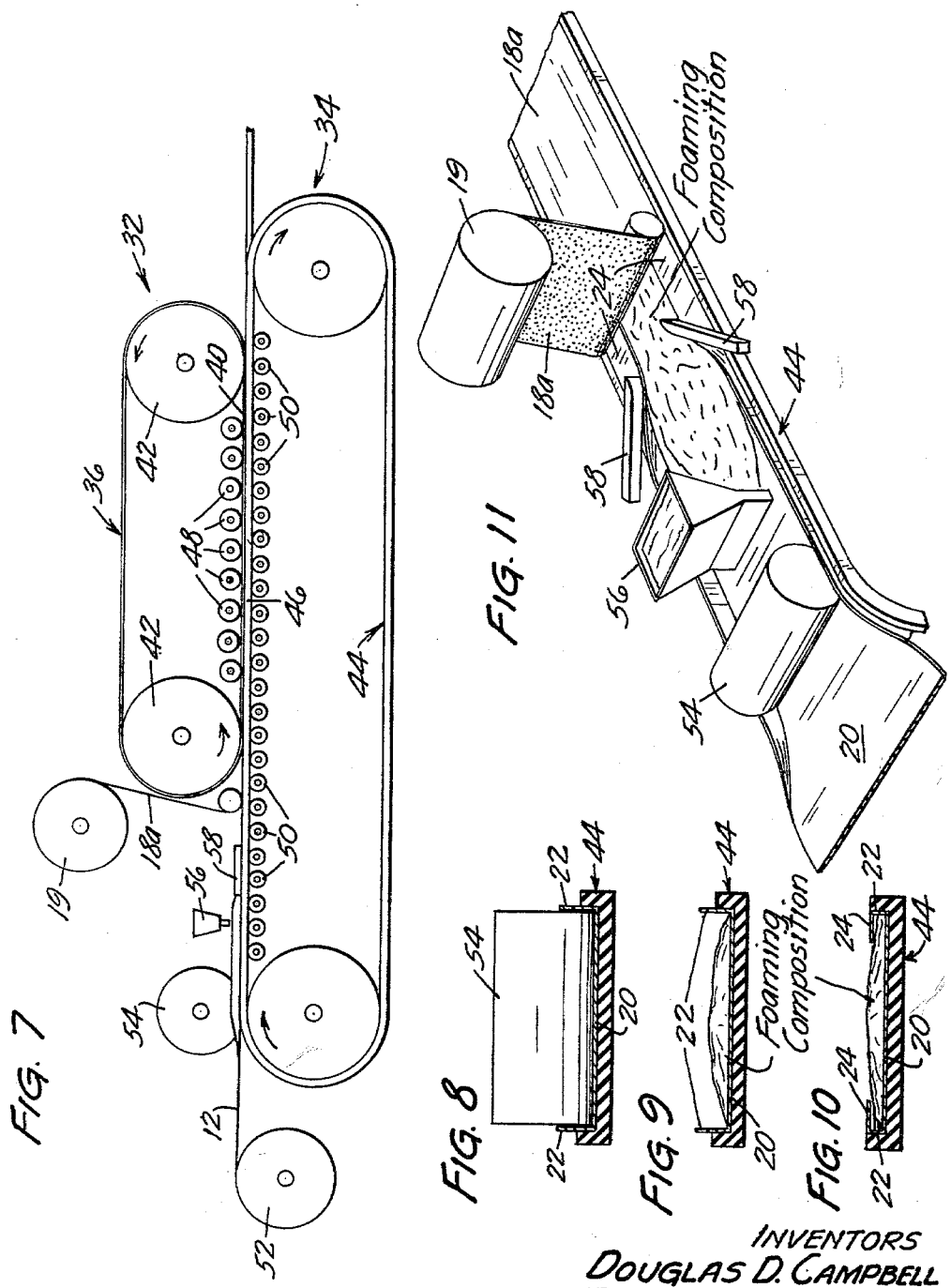

United States Patent Office 3,173,826
Patented Mar. 16, 1965

3,173,826
FOAMED STRIP MATERIAL AND METHOD
OF MAKING
Douglas D. Campbell, Minneapolis, and Theodore Buchholtz, St. Paul, Minn., assignors to Minnesota Mining and Manufacturing Company, St. Paul, Minn., a corporation of Delaware
Filed June 9, 1959, Ser. No. 819,133
14 Claims. (Cl. 161—161)

This invention relates to a cushioning strip material and more particularly relates to an adhesive surfaced foamed strip material for use as paneling, chair railing, baseboards, etc. and to a novel method of making such strip material.

It is an important object of this invention to provide a new and useful method for making adhesive surfaced flexible, cellular, foamed backings which comprises foaming the cellular backing into place against the adhesive surfacing layer thereby aggressively adhering the cellular backing and the adhesive surfacing layer to one another, and, to certain new and useful products made thereby.

Another object is to provide a cushioning adhesive strip material which may be easily cut and readily mounted on or applied to a supporting surface by simply pressing it against such surface with the adhesive layer in contact with the surface, and which strip material may be readily removed from its supporting surface for reuse elsewhere or for discard, without harm to either itself or its supporting surface.

It is another object of this invention to provide a unique method of making a cushioning adhesive strip material having a thin, tough, flexible facing skin adhered to a yieldable, resilient, flexible, shape-retaining cellular body, which method comprises shaping the facing skin to the desired shape of the cushioning body and forming the cellular cushioning body from a foaming composition in situ within the shaped facing skin.

It is still another object of the invention to provide a method of forming a cushioning adhesive strip material by foaming the cushioning body of the strip within a tube formed by the facing skin for the strip and an adhesive layer and its protective liner forming the back of said strip.

These objects and other objects and advantages which will become apparent as the description proceeds are obtained with this invention as will be described in more detail hereinafter in connection with the accompanying drawings wherein:

FIGURE 1 is a perspective view of a cushioning adhesive strip material made in accordance with this invention;

FIGURE 2 is an end view of the cushioning adhesive strip of FIGURE 1;

FIGURE 3 is a perspective view made in accordance with a segment of the cushioning adhesive strip material illustrating the manner in which the adhesive protective liner is stripped from the adhesive for attaching the strip to a supporting surface;

FIGURE 4 illustrates in perspective a portion of a room wherein the cushioning adhesive strip material of this invention is utilized as a chair rail;

FIGURE 5 is a perspective view of a section of a wall wherein the cushioning adhesive strip material of this invention is used as a cushioning panel for a wall as well as a baseboard for the wall;

FIGURE 6 is a front elevational view of a post or the like wherein the cushioning adhesive strip is used as a protective bumper;

FIGURE 7 is a diagrammatic side elevational view of an apparatus that may be used to practice the unique method of this invention in making the cushioning adhesive strip material;

FIGURES 8-11 disclose the sequence of operations of the apparatus of FIGURE 7 in the practice of the method of formation of the cushioning adhesive strip material.

It will be understood that the drawings are for illustrative purposes to aid in describing the invention and that the thicknesses of the facing skins, adhesive layer and protective liner for the adhesive layer of the strip material are in general greatly exaggerated for clarity of observation.

With more particular reference to the accompanying drawings attention is first directed to FIGURES 1-6 wherein there is illustrated a preferred embodiment of a cushioning adhesive strip material made in accordance with this invention.

Referring first to FIGURE 1 there is shown a preferred form of the cushioning adhesive strip material 10 of this invention. This strip 10 comprises generally a facing skin 12 of thin, tough, flexible sheet material, a yieldable, resilient, cellular cushioning body 14, and a backing of an adhesive layer 16 and an adhesive protective liner 18.

The facing skin may be of any convenient flexible sheet material such as vinyl sheeting, polyester sheeting, woven cloth, reflective sheeting such as "Scotchlite," a trademark of Minnesota Mining & Manufacturing Company for a reflex reflective sheeting, or other desired sheet material. The surface of the sheet material forming the facing skin may be embossed, grained, stained, and/or painted or otherwise decoratively finished to provide a decorative finished appearance to blend or contrast with any desired decor.

The cushioning body 14 of the strip is formed of a suitable resilient, yieldable, shape-retaining cellular material and is adhered firmly to the inside surface of the facing skin 12.

The cushioning body 14 may be adhered to the inside surface of the facing skin 12 by virtue of its own adhesion, through the medium of an intervening adhesive, or through the medium of a primer coating to enhance its adhesion to the inside surface of the facing skin and may be formed of any resilient, shape-retaining, yieldable cellular material such as foam rubber, blown rubber sponge, vinyl foams, or polyurethane foams. Because of the ease with which and short time in which they may be foamed in situ and because of their natural adherence to most surfaces with which they are in contact during foaming, polyurethane foams are generally preferred. These polyurethane foams may be foamed in situ from liquid foaming compositions applied directly in contact with the facing skin 12 and they adhere well to almost any of the sheet materials contemplated for use as facing skins.

The back of the cushioning strip 10 is provided with a layer of adhesive 16 which may be of a thermosetting, pressure sensitive, or other type. Permanently tacky, pressure-sensitive adhesive compositions form the preferred adhesives for the layer 16 as these adhesives stick upon contact and require neither skill, heat, nor other components for their adhesion. Pressure-sensitive natural and synthetic rubber based adhesives are commercially available which adhere well and firmly to plaster, concrete, wood, and other conventional supporting surface materials, but which may be removed therefrom without marring or leaving undesirable adhesive deposits on the surfaces.

The side edge portions of the facing skin 12 encompass the side edges and overlie the edge portions of the back surface of the cushioning body 14. Thus, the skin 12 serves as side edge coverings 22 on the completed strip material and the inturned lips 24 of the skin overlying the edge portions of the back of the cushioning body provide a neat, finished appearance to the completed strip material 10. In addition, by means to be described hereinafter, the inturned lips 24 of the facing skin serve to define the thickness of the cushioning body and to provide an initial adhesive supporting surface for the adhesive layer 16 and liner 18 during formation of the cushioning body.

The adhesive protecting liner 18 may be any suitable sheet material which adheres well enough to the adhesive to remain in place during storage, bundling, or handling of the strips 10 but which has less affinity for the adhesive than the affinity of the adhesive for the back surface of the cushioned strip 10 whereby stripping the proctive liner 18 from the adhesive layer 16 leaves the adhesive layer intact on the back surface of the strip 10.

The field of application of this cushioning adhesive strip 10 is widely varied. Thus, as illustrated in FIGURE 4, the strip 10 when made up in relatively narrow widths may be effectively utilized as a cushioned chair rail. For such application the strip 10 is simply adhered by the application of light pressure to the wall along the length of the wall at a height from the floor corresponding to ordinary chair back height, as depicted by the chair 26 illustrated in the figure. An adhesive cushion strip 10 mounted in this manner protects the surface of the wall 28 from damage that would otherwise be caused by repeated bumping of the chair back into the wall. In the event of puncture, smudging or other disfigurement of the chair rail strip 10, a new strip 10 may be applied by simply peeling off the old strip and applying the new.

In FIGURE 5 there is illustrated another area of application of the cushioning adhesive strip material of this invention wherein the cushioning strip 10 is made in relatively wide widths so that the same can be used as a panel facing for a wall 28, being attached or adhered to the wall in the same manner as the chair rail noted in FIGURE 4. Also, narrower widths of the strip 10 may be used, as shown in FIGURE 5, as a baseboard. The strip may be used as door frame protectors, door stops, bumpers and in other similar environments as for example, that of FIGURE 6, wherein the strip material 10 is used as a bumper for a column or a post or the like 30.

The strip material may be made in any suitable lengths and widths, widths between about 1 inch and 2 feet being most advantageously produced. The thickness of the strip material may be varied as desired; however, thicknesses of about 1/8 to 5/16 of an inch have been found suitable for most cushioning effects. The strip is readily cut with a razor blade or scissors. To provide a finished end to match the finished side edges 22 of the strip, the cellular cushion 14 may be terminated shorter than the skin, i.e., during formation or at a later time as by removal of the terminal portion of the cushioning, and the facing skin 14 folded around the otherwise raw edge.

The uses of this cushioning adhesive strip material 10 are manifold and in addition to those specifically set forth hereinbefore the strip material may be used as wainscoting, bulletin boards and the like to which display material may be pinned, and in any one of a number of protective applications as bumpers for railings, walls, as backstop coverings to prevent injury to players in athletic contests, as picture frames, serving both as frame and hanger to attach the pictures to the wall and in such other applications as will occur from time to time.

A novel method of making the cushioning strip material 10, and an apparatus suitable for practicing this method will now be described with reference to FIGURES 7-11 of the drawing.

In practicing this method the facing skin 12 is first formed into a shallow upwardly opening channel and maintained in this position and in this shape by a suitable supporting mold. While the facing skin is maintained in this shape, a liquid foaming mixture or foamable composition which expands and solidifies to the resilient, cellular body 14 of the strip 10 is deposited in the upwardly opening channel and as the mixture foams to its solid cellular state it expands to fill the channel. Either before, during, or after depositing the foamable composition, but, preferably after, the upturned side edge portions of the channel are folded inwardly by a suitable apparatus to form the inturned lips 24. Thereafter, as the foaming mixture continues to expand, an adhesive carrying transfer liner 18a, which comprises adhesive layer 16 and protective liner 18, is laid in covering relation over the open channel with the adhesive layer 16 adhered along its side edge portions to the inturned lips 24 of the facing skin 12 thereby completing the formation of a thin, rectangular tube composed of the facing skin 12 and transfer liner 18a within which the foamable composition expands to provide the resilient cellular body 14 of the strip 10. This tubular shape is maintained intact while the foamable composition foams in place and fills the interior of the tube, forming the cellular body 14 of the strip 10. When the foamable composition has cured to its cellular, resilient, yieldable state and has achieved its final shape corresponding to that of the tube, the confining means holding the tube shape may be removed and the strip 10 is complete.

This method of formation utilizes the facing skin of the finished cushioned strip structure as a portion of the forming medium for the cellular body of the strip and as the initial adherence support for the adhesive protective liner serving as the remainder of the confining mold in which the cellular body is foamed.

An apparatus suitable for practicing the method is illustrated diagrammatically in FIGURE 7 as comprising upper and lower endless belt assemblies 32 and 34 respectively. The upper assembly 32 comprises an endless flat belt 36 having upper and lower horizontal runs 38 and 40 respectively, the belt moving over a pair of spaced end rollers 42.

The lower endless belt assembly 34 comprises a channel shaped belt 44 with the channel opening outwardly to provide a flat bottomed shallow trough, a structure most readily apparent in the cross section thereof shown in FIGURES 8-10. The upper horizontal run 46 of the channel shaped belt of the lower conveyor assembly 34 and the lower horizontal run 40 of the flat belt 36 of the upper conveyor belt assembly 32 move in the same direction and in abutment with one another throughout their coextensive path at the same speed. A series of small pressure rollers or the like 48 pressing against the back surfaces of the lower run 40 of the flat belt 36 maintain the same in relatively firm engagement with the edges of the channel shaped belt 44 of the lower belt assembly 34. The upper run 46 of the channel shaped belt 44 is maintained generally flat and in contact with the lower run 40 of the flat belt 36 of the upper conveyor belt assembly 32 by means of small supporting rollers or the like 50.

In the utilization of this assembly to make cushioned adhesive strip material 10, the facing skin 12 of the cushioned adhesive strip material 10 is fed from a supply roll 52 onto the upper run 46 of belt 44 whereupon a small form roller 54 presses it into the channel of the channel shaped belt 44 whereby the front face 20 of the facing skin lies flat against the bottom of the channel and the side edge portions 22 of the facing skin are upstanding.

The movement of the facing skin along the channel shaped belt is continuous and after being pressed to its channel shape in the channel shaped belt 44 of the conveyor assembly 34, a foaming composition is continuously deposited from a suitable mixing device 56 upon the inside surface of the facing skin as the facing skin moves with the belt 44. Either prior to or after this step, a pair of fingers 58 on opposite sides of the upper run 46 of the belt 44, shown in detail in FIGURE 11, folds over the extremities of the side edge portions 22 of the facing skin to form the inwardly turned lips 24 of the facing skin.

Then, as the foaming composition continues to expand toward its final foam volume the skin moves between run 40 of belt 36 and run 46 of belt 44. Adjacent the entrance of the facing skin to the coextensive path of belt runs 40 and 46 there is pressed thereagainst the adhesive transfer film 18a drawn from a supply roll 19 and comprising adhesive layer 16 and its protective liner 18. As film 18a is drawn between belt runs 40 and 46 the adhesive layer 16 thereof contacts and adheres to the inturned lips 24 of the facing skin 22. The pressure rolls 48 maintain the adhesive layer 16 of the transfer film 18a in face to face contact with the inturned lips 24 to form a tube within which the foaming composition expands and cures to its final, yieldable, resilient, shape-retaining cellular state, which state is substantially achieved prior to the time the strip 10 passes beyond the coextensive portions of the belt runs 40 and 46.

An alternative procedure is to coat the inturned lips 24 with adhesive prior to their passage between belts 36 and 44 and apply the protective liner 18 separately in the same manner as depicted for transfer film 18a. In either case the adhesive layer 16 agressively adheres to the lips 24 and the cellular body 14 but only lightly adheres to its carrying strip; thus, the adhesive carrying film 18a serves as the adhesive protective liner 18, being readily peeled from the back of cushioning strip 10 without disturbing the attachment of adhesive layer 16 to the back of the strip 10.

The continuous production of cushioning strip material following the method hereinbefore described is more precisely illustrated in the specific example following, which example is illustrative of the continuous production of a specific cushioning adhesive strip material made in accordance with the invention, and is not inserted for purposes of limitation.

*Example*

An apparatus corresponding to that previously described and having upper and lower endless belts with coextensive runs wherein the upper flat belt and the lower channel shaped belt are in contact with one another for a length of 12 feet was used to make 4 inch wide cushioning adhesive strip material 10 of the type illustrated in the preferred embodiment at a rate of 3 feet per minute as follows.

The channel trough of the channel shaped belt was about 4 inches wide and approximately ¼ inch deep. The facing skin used was a commercially available 5 mil vinyl sheeting, comprising a plasticized vinyl chloride polymer, which sheeting is tough, flexible, readily embossed and painted and grained or otherwise finished as desired. The web of the sheeting as it unrolled from its supply roll was 6 inches wide and as it was fed onto the channel belt 44 of the lower conveyor assembly 34, the roller 54 pressed it into its channel shape within the belt.

Thence, a foaming urethane composition was deposited on the inside surface of the facing skin at the rate of about 60 grams of foaming composition per foot of 4 inch chair rail strip to be made. This composition foams to about four times its pouring volume and was composed of a polyurethane prepolymer and a foaming agent and catalyst mixed together in a mixer and immediately thereafter deposited on the facing skin web. The mixer employed comprised a rotor rotating within a cone stator into which the polyurethane resin and foaming catalyst were metered from separate suply tubes; the mixer discharged the mixed foaming composition from the mixing chamber directly onto the inside surface of the facing skin.

The foaming composition comprised the following two parts and is more fully described in copending application Serial No. 642,967 of G. C. Harrison and H. Brinker, filed February 28, 1957; now Patent No. 2,921,916 issued Jan. 19, 1960.

Part A—100 parts prepolymer
Part B—5 parts water, one part diethylethanolamine.

The polyurethane prepolymer, part A was composed of the following mixture:
500 grams castor oil
45 grams diglycollic acid
240 grams toluene diisocyanate This prepolymer was prepared by first esterifying the castor oil with the diglycollic acid in a kettle at from 400° F. to about 450° F. for about 4 hours to an acid number of 0 to 1, toluene being used to entrain off the water produced by the esterification under vacuum. The polyester so prepared was cooled and the toluene diisocyanate reacted with it to form the syrupy prepolymer Part A and part B were mixed at the rate of 100 grams of part A to 6 grams of part B, in the mixing machine and deposited directly therefrom onto the moving web of the facing skin. Immediately thereafter the fingers 58 fold over the lips 24 of the side edges 22 of the facing skin 12.

At this point, the web passed under the belt run 40 carrying a film pressure-sensitive adhesive film 18a. This pressure-sensitive adhesive transfer film was fed between the belts from the supply roller 19 with the adhesive layer facing the open top of the channel whereby the foamable composition foams in contact with the adhesive layer. The transfer film comprised generally an acrylate based pressure-sensitive adhesive carried on a thin polyethylene backing. A suitable silicone treated paper backed transfer adhesive film is available commercially in roll form as "Adhesive Tape No. 466" from Minnesota Mining and Manufacturing Company.

The transfer film initially adhered to the inturned lips of the facing skin by being pressed thereagainst between the endless belts. The foaming composition continued to expand within the tube thus formed as the tube progressed between the mating belts and had fully expanded and had cured to a solid cellular state conforming to the tube shape by the time the finished cushioning strip material emerged from between the belts.

Of course, the foregoing example is illustrative only of one means by which the method of this invention may be practiced. Other means are contemplated. A strikingly colored cushioning strip material has been made up utilizing transparent facing skins and red, black, and other colored foams with the foam supplying the color to the strip material.

Also, the facing skin may be extruded directly on the channel shaped belt with any embossment or other surface effect being formed in the skin by a pattern provided on the belt surface. Other foamable compositions may be used such as those of polystyrene or polyethylene. In the utilization of foamable compositions of polystyrene beads, after the beads are foamed and expanded to form a cellular cushioning body it is necessary to crush or "collapse" the body to some degree to provide resiliency and flexibility—these properties being determined to a large extent by the degree of collapse to which the cellular body is subjected.

Upon perusal of the invention just described, numerous minor modifications and changes other than those specifically described hereinbefore will probably occur to those skilled in the art. Thus, it is to be understood that the invention is not limited to the precise embodiments described and that the compass of the invention is as defined in the appended claims.

What we claim is:

1. A method of making a cushioned adhesive strip which comprises expanding a foamable composition and curing the same to a shape-retaining, cellular, cushioning body within a tubular shell comprising a facing skin and an adhesive film to which said cellular cushioning body adheres upon formation thereof, maintaining the shape of said tubular shell such that said facing skin forms and surfaces at least the front and side edges of the cellular cushioning body during expansion and curing of said cushioning body, and said adhesive film providing a coating of adhesive on the back of said cushioned strip.

2. A method of making a cushioned adhesive strip which comprises expanding a foamable composition and curing the same to a shape-retaining, cellular, cushioning body within a tubular shell, said shell comprising a flexible facing skin shaped into a channel and a film of pressure sensitive adhesive closing said channel, maintaining the shape of said tubular shell during expansion and curing of said cushioning body, said body expanding into adherent contact with said adhesive film and thereby providing a pressure-sensitive adhesive coating thereon.

3. A method of making a cushioned adhesive strip which comprises expanding a foamable composition and curing the same to a shape-retaining, cellular, cushioning body within a tubular shell, said shell comprising a flexible facing skin shaped into a channel having a central web portion, upstanding side edge portions, and inturned lips on said side edge portions overlying said central web portion and extending toward one another, and a transfer adhesive film covering the opening between said lips, said film having the adhesive layer thereof adhered to said lips, the shape of said tubular shell being maintained during expansion and curing of said cushioning body, said body expanding against and adhering to said transfer film, said adhesive being more adherent to said body than to said film.

4. The method of making a cushioning adhesive strip material having finished edges which comprises maintaining a tough, flexible facing sheet material in channel form having a substantially flat central web and upturned side edge portions terminating in inturned lips overlying said flat central web, and foaming in the channel so formed a sufficient amount of a foaming composition which expands to a flexible, shape-retaining, resilient cellular body to fill said channel, and thereafter while said foaming composition is expanding to its shape-retaining, resilient cellular state, covering the open top of said channel with a carrier web having an adhesive coating on the face thereof facing said channel which adhesive coating is more adherent to said facing sheet material than it is to said carrier web, and maintaining said carrier web generally parallel to said flat central web of said flexible facing sheet and adhered to said inturned lips while said foaming composition expands to its shape-retaining, resilient cellular body state.

5. The method of making a cushioning adhesive strip material having finished edges which comprises maintaining a tough, flexible facing sheet material in channel form having a substantially flat central web and upturned side edge portions terminating in inturned lips overlying said flat central web, and foaming in the channel so formed a sufficient amount of a foaming composition which expands to a flexible, shape-retaining, resilient cellular body to fill said channel, and thereafter while said foaming composition is expanding to its shape-retaining, resilient cellular state, covering the open top of said channel with a carrier web having a pressure sensitive adhesive coating on the face thereof facing said channel which adhesive coating is more adherent to said facing sheet material and to said resilient cellular body of said foaming composition than it is to said carrier web, maintaining said carrier web generally parallel to said flat central web of said facing sheet and adhered to said inturned lips while said foaming composition expands to its shape-retaining cellular body with said pressure sensitive adhesive layer more firmly anchored to said inturned lips and said cellular body than to said carrier web whereby said carrier web can be stripped from said strip material without disturbing said adhesive layer on said strip material.

6. A method of making a cushioning adhesive strip material which comprises foaming against the adhesive surface of an adhesive transfer film a foaming composition which expands to a flexible shape-retaining, resilient cellular body.

7. A method of making an adhesive strip material which comprises depositing a liquid foamable mixture which expands and solidifies into a cellular backing in a shaped open faced shallow mold, covering the open face of said mold with an adhesive transfer strip with the adhesive side facing the open mold, and causing the foamed mixture to expand against and adhere to said adhesive side to form an adhesive surfaced foamed backing.

8. A method of making an adhesive faced cellular backed sheet material which comprises depositing onto a moving belt a liquid foamable composition which expands to a flexible, shape-retaining cellular body thereon and before said liquid composition has expanded to its full height on said belt, overlaying the belt with a carrier web having an adhesive coating on the face thereof facing said belt which adhesive coating is more adherent to said cellular body than to said carrier web, expanding said foamable composition against said adhesive coating and completing the curing thereof to a flexible, solid, resilient cellular sheet material having an adhesive coating thereon.

9. A method of making an adhesive faced cellular sheet material which comprises molding into sheet form from an expanding foaming composition, a flexible shape-retaining resilient cellular body, while confining expansion of said body in one direction by pressurably maintaining a carrier web having a pressure-sensitive adhesive coating on one face thereof at the desired limit of expansion of said body in said one direction, said adhesive coating facing said body and having greater adherence thereto upon expansion of said body thereagainst than to said carrier web whereby there is formed an adhesive faced cellular sheet material.

10. An adhesive faced cellular sheet material having a pressure sensitive adhesive applied to at least one face thereof by the method of claim 9.

11. An adhesive strip material having a pressure-sensitive adhesive thereon made in accordance with the method of claim 6.

12. An adhesive faced cellular backed sheet material having a pressure-sensitive adhesive thereon made in accordance with the method of claim 7.

13. An adhesive faced cellular sheet material having a pressure-sensitive adhesive thereon made in accordance with the method of claim 8.

14. A cushioning adhesive strip material having a pressure-sensitive adhesive thereon made in accordance with the process of claim 5.

References Cited in the file of this patent

UNITED STATES PATENTS

| | | |
|---|---|---|
| 1,514,827 | Birdsey | Nov. 11, 1924 |
| 1,750,621 | Brookby | Mar. 18, 1930 |
| 1,790,252 | Speer | Jan. 27, 1931 |
| 2,090,084 | Walper | Aug. 17, 1937 |
| 2,292,024 | Dreher | Aug. 4, 1942 |
| 2,762,738 | Teale | Sept. 11, 1956 |
| 2,841,205 | Bird | July 1, 1958 |
| 2,959,242 | Muller et al. | Nov. 8, 1960 |